United States Patent
Oyasato et al.

(10) Patent No.: US 7,026,379 B2
(45) Date of Patent: Apr. 11, 2006

(54) COPOLYMER RESIN COMPOSITION AND PRODUCTION PROCESS THEREOF

(75) Inventors: Yumiko Oyasato, Kanagawa-ken (JP); Shinetsu Fujieda, Kanagawa-ken (JP); Kazutaka Matsumoto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 24 days.

(21) Appl. No.: 10/233,521

(22) Filed: Sep. 4, 2002

(65) Prior Publication Data

US 2003/0069354 A1 Apr. 10, 2003

(30) Foreign Application Priority Data

Sep. 26, 2001 (JP) ............... 2001-293162

(51) Int. Cl.
*C08L 5/04* (2006.01)
*C08L 5/06* (2006.01)

(52) U.S. Cl. ............... 524/35; 524/72; 525/54.2; 525/54.21; 428/331; 428/336; 428/480; 428/910; 428/922

(58) Field of Classification Search ............... 524/35, 524/72; 525/54.2, 54.21; 428/331, 336, 428/480, 910, 922
See application file for complete search history.

(56) References Cited

U.S. PATENT DOCUMENTS 5,191,016 A 3/1993 Yalpani
5,247,013 A 9/1993 Shinoda et al.
5,310,865 A 5/1994 Enomoto et al.
5,914,188 A * 6/1999 Kobayashi et al. ......... 428/331
6,124,384 A * 9/2000 Shiraishi et al. ............... 524/35

FOREIGN PATENT DOCUMENTS

| DE | 42 13 282 A1 | 10/1993 |
| EP | 732341 A2 * | 9/1996 |
| FR | 2 765 228 | 12/1998 |
| JP | 9-143253 | 6/1997 |

* cited by examiner

*Primary Examiner*—Robert D. Harlan
(74) *Attorney, Agent, or Firm*—Oblon, Spivak, McClelland, Maier & Neustadt, P.C.

(57) ABSTRACT

A copolymer resin composition provided by the process of the present invention is of considerable strength and moldability and is produced by polymerization of a monosaccharide or a polysaccharide that is derived from natural objects and has a hydroxyl group, and a carboxyl group or a salt thereof with a compound having a hydroxyl group and a carboxyl group. The monosaccharide or the polysaccharide serves as a polyfunctional central compound. The copolymer resin composition is obtained through dehydration-polycondensation of (A) at least one selected from the group consisting of a monosaccharide and a polysaccharide having a hydroxyl group, and a carboxyl group or an ion-exchanged carboxyl group; and (B) at least one selected from the group consisting of (b1) hydroxycarboxylic acid, (b2) polyhydroxycarboxylic acid, (b3) a mixture of an aliphatic polyol and an aliphatic polybasic acid, and (b4) an aliphatic polyester obtained by the reaction of an aliphatic polyol with an aliphatic polybasic acid. Preferably, alginic acid is used to serve as the monosaccharide or the polysaccharide having a hydroxyl group and a carboxyl group.

19 Claims, No Drawings

COPOLYMER RESIN COMPOSITION AND PRODUCTION PROCESS THEREOF

BACKGROUND OF THE INVENTION

1. Field of the Invention

The present invention relates to a polyester resin composition using as one of its material components a monosaccharide or a polysaccharide having a hydroxyl group, and a carboxyl group or an ion-exchanged carboxyl group. The present invention also relates to a process for producing the same.

2. Description of the Related Art

Throughout the twentieth century, oil resources were limitlessly exploited and used as the source of plastics or energy. However, not only do the oil resources have a limited reserve, but used plastics, when burned, produce large amounts of carbon dioxide and are blamed for many environmental problems such as global warming. Furthermore, waste plastic materials hardly break down in the natural environment and have thus brought about serious environmental pollution.

To cope with these problems, much effort has been made to develop materials that, when discarded and left in the natural environment, are naturally degraded by microorganisms or other natural factors into harmless materials.

One example is a polyester material disclosed in Japanese Patent Laid-Open Publication No. Hei. 9-143253, which is produced through condensation-polymerization of a polysaccharide such as cellulose with a hydroxycarboxylic acid, aliphatic polyol, or aliphatic polybasic acid. This material is known to be used as a biodegradable, environmentally clean molding material. Although the polyester material is biodegradable and brings about no environmental pollution when left in the natural environment after use, it cannot be recycled and therefore must be discarded after use. For this reason, the polyester material is economically unfavorable.

On the other hand, various attempts have been made to recycle the waste plastic material: currently, products molded from polyethylene terephthalate (PET) are collected, melted, and then remolded into various molded products. However, the plastic made from the recycled materials generally has reduced strength, heat-resistance and moldability when compared to newly synthesized plastic. For this reason, applications of recycled plastics are limited to those in which poor physical properties do not lead to any practical problem. As a result, plastic recycling is still not prevalent enough.

SUMMARY OF THE INVENTION

The present invention is devised to alleviate the above-identified problems associated with conventional plastic materials and aims at provision of a resin composition composed mainly of naturally occurring materials. The resin composition is not only harmless to the environment when discarded, but also has an improved moldability and is recyclable. The present invention also provides a process for producing such resin composition.

In the course of studies to find ways to solve these problems, the present inventor has made a finding that a copolymer resin with significant strength and degradability having a large molecular weight polyester side chain can be obtained through dehydration-polycondensation of a monosaccharide or a polysaccharide having a carboxyl group and a hydroxyl group in the same molecule with a hydroxycarboxylic acid, such as lactic acid, or an aliphatic polybasic acid and an aliphatic polyol. The finding ultimately led the present inventor to bring the present invention to completion.

Accordingly, a first aspect of the present invention provides a copolymer resin composition. The composition contains at least a copolymer obtained through dehydration-polycondensation of (A) at least one selected from the group consisting of a monosaccharide and a polysaccharide having a hydroxyl group, and a carboxyl group or an ion-exchanged carboxyl group, and (B) at least one selected from the group consisting of (b1) hydroxycarboxylic acid, (b2) polyhydroxycarboxylic acid, (b3) a mixture of an aliphatic polyol and an aliphatic polybasic acid, and (b4) an aliphatic polyester obtained by the reaction of an aliphatic polyol with an aliphatic polybasic acid. As used herein, the term "ion-exchanged carboxyl group" refers to a carboxyl group having its hydrogen ion substituted with a metal ion, which is preferably an alkaline metal or an alkaline earth metal.

In the first aspect, the polysaccharide having a hydroxyl group, and a carboxyl group or an ion-exchanged carboxyl group may be alginic acid or pectin. Also, the monosaccharide having a hydroxyl group, and a carboxyl group or an ion-exchanged carboxyl group may be mannuronic acid or guluronic acid.

The alginic acid in the first aspect may be either alginic acid or an ion-exchanged form thereof. As used herein, the term "ion-exchanged form" refers to a salt of alginic acid in which the hydrogen ion of its carboxyl group has been substituted with a metal ion, which in the first aspect is preferably an alkaline metal ion or an alkaline earth metal ion. Preferably, the hydroxycarboxylic acid in the first aspect is lactic acid, and the polyhydroxycarboxylic acid is polylactic acid. Further, the aliphatic polyol is preferably ethylene glycol or 1,4-butanediol, and the aliphatic polybasic acid is preferably succinic acid or adipic acid. Also, the aliphatic polyester produced by reaction of an aliphatic polyol with an aliphatic polybasic acid is preferably polyethylene succinate and polybutylene succinate.

It is also preferred in the first aspect that the hydroxycarboxylic acid be lactic acid; the polyhydroxycarboxylic acid be polylactic acid; the aliphatic polyol be ethylene glycol or 1,4-butanediol, and the aliphatic polybasic acid be succinic acid or adipic acid; the aliphatic polyester produced by reaction of an aliphatic polyol with an aliphatic polybasic acid be polyethylene succinate or polybutylene succinate.

A second aspect of the present invention provides a process for producing a copolymer resin composition. The process includes the step of allowing a first reactant (A) and a second reactant (B) to undergo dehydration-polycondensation in the presence of a catalyst in an organic solvent containing substantially no water. The first reactant (A) is at least one selected from the group consisting of a monosaccharide and a polysaccharide having a hydroxyl group, and a carboxyl group or an ion-exchanged carboxyl group. The second reactant (B) is at least one selected from the group consisting of (b1) hydroxycarboxylic acid, (b2) polyhydroxycarboxylic acid, (b3) a mixture of an aliphatic polyol and an aliphatic polybasic acid, and (b4) an aliphatic polyester obtained by the reaction of an aliphatic polyol with an aliphatic polybasic acid.

In the second aspect, it is preferred that the amount of water in the organic solvent be controlled during the dehydration-polycondensation by removing from the reaction system at least part of the organic solvent and replenishing the reaction system with the organic solvent containing water in an amount less than, or equal to, the amount of water in the removed organic solvent. Upon this, the removed organic solvent may be processed so that it contains less water than the organic solvent in the reaction system and the reaction system may be replenished with this processed organic solvent. The removed organic solvent may be processed by bringing the solvent into contact with a desiccating agent. The desiccating agent may be selected from the group consisting of an ion-exchange resin, a molecular sieve, diphosphorus pentoxide, and a metal hydride.

It is preferred in the second aspect to use alginic acid or pectin as the monosaccharide or the polysaccharide having a hydroxyl group, and a carboxyl group or an ion-exchanged carboxyl group. Preferably, the alginic acid is either alginic acid or an ion-exchanged form thereof. The ion-exchanged form of alginic acid may be an alkaline metal salt or alkaline earth metal salt of alginic acid. The pectin may be pectin or an ion-exchanged form thereof. The ion-exchanged form of pectin may be an alkaline metal salt or alkaline earth metal salt of pectin.

Further, it is preferred in the second aspect that the hydroxycarboxylic acid be lactic acid; the polyhydroxycarboxylic acid be polylactic acid; the aliphatic polyol be ethylene glycol or 1,4-butanediol, and the aliphatic polybasic acid be succinic acid or adipic acid; and the aliphatic polyester produced by reaction of an aliphatic polyol with an aliphatic polybasic acid be polyethylene succinate or polybutylene succinate.

In the above-described invention, the term "monomer" refers to hydroxycarboxylic acid, aliphatic polyol, or aliphatic polybasic acid, and the term "polymer" refers to polyhydroxycarboxylic acid or aliphatic polyester of aliphatic polyol and aliphatic polybasic acid. According to the present invention, the following copolymers can effectively be obtained in a short period of time: copolymers having alginic acid, a polysaccharide backbone, and side chains made of large-molecular weight hydroxycarboxylic acid units; copolymers having a polysaccharide backbone and side chains made of large-molecular weight aliphatic polyol units and aliphatic polybasic acid units; copolymers having alginic acid, a polysaccharide backbone, and side chains made of large-molecular weight hydroxycarboxylic acid units, large-molecular weight aliphatic polyol units and aliphatic polybasic acid units.

The copolymer obtained by the process of the present invention has a large molecular weight and a high melting point and is of considerable strength. Therefore, the copolymer can be used as a suitable material in various molding techniques such as injection molding, extrusion molding, calender molding, blow molding, balloon molding, hollow molding, vacuum molding, and foam molding. In particular, the copolymer obtained by the process of the present invention has a considerably higher melt tension as compared to homopolymers such as polyhydroxycarboxylic acid or aliphatic polyester made of aliphatic polyol and aliphatic polybasic acid and is therefore particularly effective when used in blow molding or in the production of foamed materials. Not only does the resulting copolymer exhibit high strength, transparency and heat-resistance, which are characteristics of polylactic acid, it also exhibits a high melt tension and is thus suitable for being molded into various (molded products, such as foamed materials and blown bottles.

DETAILED DESCRIPTION OF THE PREFERRED EMBODIMENTS

Material compounds and side-materials such as solvents and catalysts for use in the present invention will now be described in the following, as will a production process of the invention.

[Monosaccharides and Polysaccharides Having a Hydroxyl Group, and a Carboxyl Group or an Ion-exchanged Carboxyl Group]

Examples of monosaccharide for use in the present invention having a hydroxyl group, and a carboxyl group or a salt thereof include mannuronic acid and guluronic acid, which together constitute alginic acid. Examples of polysaccharide having a hydroxyl group, and a carboxyl group or an ion-exchanged carboxyl group include alginic acids, pectin, gellan gum, rhamsan gum, welan gum, and salts thereof. Of these, alginic acids are particularly preferred because of their availability, and the mechanical strength and degradability of products molded from the resin, each of which is a desired property in the present invention.

[Alginic Acids]

As used herein, alginic acids, each a polysaccharide for use in the present invention, refers not only to alginic acid, but also to derivatives thereof as well as to ion-exchanged forms thereof. These compounds can be used either independently or in combination. Further, the polysaccharide may be any of those extracted from natural objects or those artificially synthesized or semi-synthesized. The natural objects to serve as the source of the polysaccharides may be any living organism or microorganism.

The ion-exchanged forms of alginic acid may be a salt that the carboxyl group of alginic acid forms with an alkaline metal or alkaline earth metal.

In the present invention, the alginic acids preferably have a molecular weight of 3,000 or larger, in order to produce the copolymer resin composition of practical strength in a short period of time.

[Hydroxycarboxylic Acid]

The hydroxycarboxylic acid for use in the present invention is an aliphatic carboxylic acid having a hydroxyl group within the molecule. Examples include lactic acid, glycolic acid, 3-hydroxybutyric acid, 4-hydroxybutyric acid, 3-hydroxyvaleric acid, 5-hydroxyvaleric acid, and 6-hydroxycaproic acid. If the hydroxycarboxylic acid has a chiral carbon within the molecule, the D-form and L-form of the compound may be used either independently or as a racemic mixture. Preferably, L-form alone is used. Use of the L-form alone is preferred since the resulting polymer has a high degree of polymerization and thus a high moldability. Also, one type of hydroxycarboxylic acid may be mixed with another type of hydroxycarboxylic acid. For example, lactic acid may be mixed with glycolic acid to produce a copolymer of lactic acid and glycolic acid. [Polyhydroxycarboxylic Acid]

The polyhydroxycarboxylic acid for use in the present invention may be obtained either through dehydration-polycondensation of the above-described hydroxycarboxylic acid or through ring-opening polymerization of a cyclic dimer of hydroxycarboxylic acid, such as lactide and glycolide, or a cyclic form of hydroxycarboxylic acid, such as ε-caprolactone. It should be appreciated that the polyhydroxycarboxylic acid for use in the present invention may be a copolymer obtained through condensation-polymerization of one type of hydroxycarboxylic acid with another. The molecular weight of polyhydroxycarboxylic acid for use in the present invention is not limited to a particular range. Thus, polyhydroxycarboxylic acid with the degree of polymerization of several tens or less, or oligomers of hydroxycarboxylic acid, may also be used.

Preferably, the hydroxycarboxylic acid is lactic acid and the polyhydroxycarboxylic acid is polylactic acid, in view of availability of the material, prices, and properties of the resulting copolymer.

[Aliphatic Polyol]

The aliphatic polyol for use in the present invention includes any compound that has at least two hydroxyl groups within the molecule. Examples include ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, and 1,4-cyclohexanedimethanol. These compounds can be used either independently or in combination.

When the aliphatic polyol has a chiral carbon within the molecule, the D-form and L-form of the compound may be used either independently or as a racemic mixture.

[Aliphatic Polybasic Acid]

The aliphatic polybasic acid for use in the present invention includes any compound that has at least two carboxyl groups within the molecule. Examples include succinic acid, oxalic acid, malonic acid, glutaric acid, adipic acid, pimelic acid, suberic acid, azelaic acid, sebacic acid, undecanedioic acid, and dodecanedioic acid. These compounds can be used either independently or in combination. When the aliphatic polybasic acid has a chiral carbon within the molecule, the D-form and L-form of the compound may be used either independently or as a racemic mixture.

Preferred combinations of the aliphatic polyol and the aliphatic polybasic acid for ensuring the flexibility of the copolymer of the present invention are given when the aliphatic polyol is ethylene glycol or 1,4-butanediol and the aliphatic polybasic acid is adipic acid or succinic acid.

[Aliphatic Polyester]

The aliphatic polyester for use in the present invention includes any aliphatic polyester obtained from the aforementioned aliphatic polyol and the aliphatic polybasic acid or reactive derivatives thereof. Examples include polyethylene adipate, polybutylene adipate, polyethylene succinate, and polybutylene succinate.

Preferably, the amount of the aliphatic polyester in the copolymer of the present invention having a polyhydroxycarboxylic acid side chain and an aliphatic polyester side chain is preferably in the range of 3.0 to 51% by weight, and more preferably, in the range of 5.0 to 40% by weight. With the amount falling in this range, the copolymer with particularly high flexibility and transparency can be obtained. If this amount is too small, the softness, ductility, plasticity, or flexibility of the copolymer tends to be insufficient:, whereas the transparency is reduced if the amount is too large. The molecular weight of aliphatic polyester for use in the present invention is not limited to a particular range. Thus, aliphatic polyesters having the degree of polymerization of several tens or less, or oligomers, may also be used.

[Condensation Polymerization]

The condensation polymerization reaction in accordance with the present invention can be carried out without using any solvent. For example, the monosaccharide or polysaccharide having a hydroxyl group, and a carboxyl group or an ion-exchanged carboxyl group (hereinafter, the monosaccharides or polysaccharides having a hydroxyl group, and a carboxyl group or an ion-exchanged carboxyl group are collectively referred to as alginic acids or the like) can be efficiently reacted with the aliphatic polyol and the aliphatic polybasic acid in a homogenous system.

When the polymer is to be reacted with the alginic acid or the like in the present invention, the alginic acid or the like preferably has a high compatibility with the polymer. If the alginic acid or the like has a low compatibility with the polymer, then the reaction tends to become non-uniform during dehydration-polycondensation and may result in formation of gel-like components insoluble in the solvent. For this reason, the alginic acid or the like for use in the present invention is preferably an alginic acid that has not undergone ion-exchange process.

[Organic Solvent]

The organic solvent for use in the present invention may be any solvent that can dissolve the material compounds but does not prevent the dehydration-polycondensation. Examples of the organic solvent include hydrocarbon solvents, such as toluene, xylene, and mesitylene; harogen-containing solvents, such as chlorobenzene, bromobenzene, iodobenzene, dichlorobenzene, 1,1,2,2-tetrachloroethane, and p-chlorotoluene; ketone solvents, such as 3-hexanone, acetophenone, and benzophenone; ether solvents, such as dibutylether, anisole, phenetole, o-dimethoxybenzene, p-dimethoxybenzene, 3-methoxytoluene, dibenzylether, benzylphenylether, and methoxynaphthalene; thioether solvents, such as phenylsulfide, and thioanisole; ester solvents, such as methyl benzoate, methyl phthalate, and ethyl phthalate; diphenylether solvents including diphenylether, alkyl-substituted diphenylethers, such as 4-methylphenylether, 3-methylphenylether, and 3-phenoxytoluene, halogen-substituted diphenylether, such as 4-bromophenylether, 4-chlorophenylether, 4-bromodiphenylether, and 4-methyl-4'-bromodiphenylether, alkoxy-substituted diphenylethers, such as 4-methoxydiphenylether, 4-methoxyphenylether, 3 -methoxyphenylether, 4-methyl-4'-methoxydiphenylether, and cyclic diphenylethers, such as dibenzofuran and xanthene. These solvents can be used either independently or as a mixture.

Since the production process of the present invention is a dehydration reaction and for the reasons described below, the organic solvent for use in the present invention may be any organic solvent that permits substantially complete removal of water from the system and may or may not be one that forms an azeotropic mixture with water or one that forms a separate phase from the aqueous phase. It is preferred, however, that the organic solvent for use in the present invention be one that permits separation of water through the use of separation means or distillation means. Preferably, the organic solvent for use in the present invention has a boiling point of 100° C. or above, more preferably 135° C. or above. Carrying out the reaction at a low temperature under high vacuum conditions allows the dehydration reaction to proceed efficiently without causing any unfavorable side reaction.

For the reasons described above, the halogen-containing solvents, the ether solvents, the alkyl-aryl ether solvents, and the diphenylether solvents are particularly preferred for the purpose of obtaining the copolymer with particularly large weight-average molecular weight. Of these, the halogen solvents, the alkyl-aryl ether solvents, and the diphenylether solvents are still more preferred. While in the present invention, the organic solvent may be used in any amount that can ensure the progress of the reaction, the amount is preferably such that the concentration of the resulting polymer falls within the range of 5 to 95%. In general, from the industrial viewpoint, the amount of the organic solvent is determined based on the reaction rate, purity of the reaction products, volumetric efficiency, and collection rate of the solvent and other factors.

Since the reaction of the present invention is a dehydration reaction, water is produced as the reaction proceeds. The resulting water facilitates hydrolysis of the copolymer produced by dehydration-polycondensation, thereby preventing formation of large-molecular weight copolymers. Excess water in the reaction system prevents the reaction. In addition, if a monomer such as the aliphatic polyol or the aliphatic polybasic acid used in the reaction remains in the reaction system at a certain stage of the reaction, the dehydration-polycondensation reaction is hindered. Thus, water and/or the monomer must be removed from the reaction system in order to increase the reaction rate and obtain the copolymer of a larger molecular weight.

The process for removing water and/or the monomer from the reaction system in accordance with the present invention also encompasses a process in which excess organic solvent is used and is simply removed along with water and a process in which organic solvent in the reaction system is processed with another organic solvent. Any desiccating agent or adsorbent may be used to process the solvent removed from the reaction system. Such agents may be any desiccating agent or adsorbent that can remove water and/or the monomer from the reaction system to a degree that allows the reaction to proceed, to a degree that permits production of a large-molecular weight product with a sufficiently high degree of polymerization, or to a degree that prevents decomposition of the products due to reversible reaction.

[Desiccating Agent/Absorbent]

While any of conventional desiccating agents or moisture adsorbent may be used to serve as the desiccating agent or the moisture adsorbent for use in the present invention, particularly preferred are molecular sieves, such as molecular sieve 3A, molecular sieve 4A, molecular sieve 5A, and molecular sieve 13X, alumina, silica gel, calcium chloride, calcium sulfate, diphosphorus pentoxide, concentrated sulfuric acid, magnesium perchlorate, barium oxide, calcium oxide, potassium hydroxide, sodium hydroxide, and metal hydrides such as calcium hydride, sodium hydride, and lithium aluminum hydride, alkaline metals such as sodium, and ion-exchange resins. These desiccating agents or adsorbents may be used either independently or in combination. Of these, molecular sieves and ion-exchange resins (in particular, cation-exchange resins) are particularly preferred because of their readiness in handling and recycling. Also, catalysts are preferably used in the present invention to increase the reaction rate and obtain a large-molecular weight copolymer.

[Catalyst]

While any of conventional catalysts for catalyzing dehydration-polycondensation reaction can be used to serve as the catalyst for use in the present invention, particularly preferred are metals of the groups II, III, IV, and V of the periodic table, and oxides and salts thereof. Specific examples include metals, such as zinc dust, tin dust, aluminum, and magnesium, metal oxides, such as tin oxide, antimony oxide, zinc oxide, aluminum oxide, magnesium oxide, titanium oxide, and germanium oxide, metal halides, such as tin (II) chloride, tin (IV) chloride, tin (II) bromide, tin (IV) bromide, antimony fluoride, zinc chloride, magnesium chloride, and aluminum chloride, sulfates, such as tin sulfate, zinc sulfate, and aluminum sulfate, carbonates, such as magnesium carbonate, and zinc carbonate, salts of organic carboxylic acids, such as tin acetate, tin octanoate, tin lactate, zinc acetate, and aluminum acetate, salts of organic sulfonic acids, such as tin trifluoromethanesulfonate, zinc trifluoromethanesulfonate, magnesium trifluoromethanesulfonate, tin methanesulfonate, and tin p-toluenesulfonate. These catalysts may be used either independently or in combination. Of these, tin catalysts are most preferred because of their reactivity of polymerization.

Other examples of the catalyst include organic metal oxides of the above-described metals, such as dibutyltin oxide, metal alkoxides of the above-described metals, such as titanium isopropoxide, and metal alkyls of the above-described metals, such as diethyl zinc. These catalysts can also be used either independently or in combination. The catalyst for use in the present invention may be used in any amount that can significantly increase the reaction rate.

Preferably, the amount of the catalyst is in the range from 0.0001 to 5% by weight, and more preferably, in the range from 0.001 to 1% by weight with respect to the amount of the monomer and/or the polymer in view of economical efficiency.

When the reaction in the present invention involves an organic solvent, the reaction can be carried out at any temperature at which organic solvent of the reaction system remains in a liquid phase to allow the reaction to proceed. Since the solvent is capable of forming an azeotropic mixture with water, no substantial problem results should the boiling point be lowered, as long as the reaction can proceed at a predetermined reaction temperature. When the reaction in the present invention involves an organic solvent, the reaction temperature is typically in the range of 80 to 200° C., preferably in the range of 100 to 200° C., and more preferably in the range of 110 to 180° C. in view of the rate at which the polymer is produced and the rate at which the polymer is thermally degraded. The reaction is typically carried out at a temperature at which the organic solvent distills out under atmospheric pressure. When organic solvent with a relatively high boiling point is used to bring the reaction temperature into a preferred range, the reaction may be carried out under a reduced pressure.

The process for producing the copolymer of the present invention is preferably carried out in vacuum or in an atmosphere of inert gas such as nitrogen and argon with no moisture permitted into the system from outside while the moisture generated in the system is being removed. Alternatively, the process may involve continuous replacement of the reaction atmosphere with an inert gas or bubbling with an inert gas. The reaction for producing the copolymer of the present invention may be carried out either as a continuous process or as a batch process. Dehydration of the solvent and replenishment of the solvent can be carried out as either a continuous process or a batch process.

[Reaction Steps]

In reacting the aliphatic polybasic acid and the aliphatic polyol with the alginic acid or the like in the present invention, or in reacting the hydroxycarboxylic acid or polyhydroxycarboxylic acid and the aliphatic polyester with the alginic acid or the like in the present invention, a series of reaction steps are carried out in a proper sequence, which is determined based on the types of the monomer and the polymer. A preferred sequence of the reaction steps is described in the following.

1) A Preferred Sequence of Reaction Steps for Reacting the Alginic Acid or the Like with the Polyester of the Aliphatic Polybasic Acid and the Aliphatic Polyol.

i) First Step: Step for Producing a Small-molecular Weight Polyester

An amount of an aliphatic polybasic acid and an equal or greater amount of an aliphatic polyol are allowed to undergo dehydration-polycondensation without using any solvent and in the presence of the catalyst under a temperature/pressure condition that does not cause evaporation of the aliphatic polyol. The weight-average molecular weight of the aliphatic polyester obtained in this reaction is from about 500 to about 1,000 and can be increased to as large as about 5,000.

ii) Second Step: Step for Producing a Large-molecular Weight Polyester.

After the first step has been completed, the reaction system is heated under a reduced pressure to remove excess polyol. This is followed by addition of solvent and heating under a reduced pressure. Water resulting from the dehydration reaction and the remaining aliphatic polyol are removed along with the solvent to further increase the molecular weight of the aliphatic polyester. Using a water separator, water is removed from the separated solvent and the solvent is returned to the reaction system. The amount of water remaining in the solvent is preferably reduced to 500 ppm or less before the solvent is returned to the system. The organic solvent may be used in any amount that can ensure the progress of the reaction. A preferred amount of the organic solvent is, for example, such that the concentration of the resulting polymer is about 25%. The reaction is then allowed to proceed for several hours to produce an aliphatic polyester having a molecular weight of about 15,000 to about 50,000 although the molecular weight may vary depending on the type of the solvent.

iii) Reaction of Alginic Acid or the Like with Aliphatic Polyester

After the second step is completed, the alginic acid or the like is added to the reaction system and the system is heated under a reduced pressure to carry out dehydration-condensation reaction. In carrying out this reaction, the water separator used in the second step is disconnected and instead, a tube filled with the desiccating agent or the moisture adsorbent is connected to the reactor. The solvent that has distilled out is passed through the layer of the desiccating agent or the adsorbent to reduce the concentration of water in the distilled solvent to 50 ppm or lower and the solvent is returned to the reaction system. Alternatively, the distilled solvent that has distilled out may be processed in a separate reactor filled with the desiccating agent or the adsorbent before it is returned to the reaction system. Also, a new solvent with a low water content may be added to the reactor. The polyol that has distilled out in trace amounts is also adsorbed onto the desiccating agent or the adsorbent to further increase the molecular weight of the resulting copolymer. The reaction is then allowed to proceed for 10 to 60 hours to obtain the copolymer with the weight-average molecular weight of 50,000 to 500,000.

2) A Preferred Sequence of Reaction Steps for Reacting Alginic Acid or the Like, Hydroxycarboxylic Acid or Polyhydroxycarboxylic Acid, and Aliphatic Polyester.

The high solubility of the alginic acid or the like in other polymers or solvents makes it possible to carry out the reaction in different sequences of the reaction steps. In one example, the polyhydroxycarboxylic acid is first reacted with the alginic acid in the presence of the catalyst and then the aliphatic polyester is reacted with the product of the first reaction. In another example, the polyhydroxycarboxylic acid is first reacted with the aliphatic polyester and the alginic acid is subsequently reacted with the product of the first reaction. In either case, uniform reaction products can be obtained without causing problems such as gelation and generation of insoluble products. The same results are obtained when the polyhydroxycarboxylic acid, the aliphatic polyester, and the alginic acid are dissolved in the organic solvent at a time for reaction in the presence of the catalyst.

Preferred reactions of each monomer or each polymer with the polysaccharide will now be described in the following.

First Embodiment

1) Reaction of Alginic Acid or the Like with Lactic Acid

A process for reacting the alginic acid or the like with lactic acid in the organic solvent in the presence of the catalyst is described in detail below. The copolymer of the present invention is obtained by reacting lactic acid with the alginic acid or the like in the organic solvent in the presence of the catalyst. When it is desired to further increase the molecular weight of the polymer obtained during the reaction, at least part of the organic solvent may be removed from the system and the organic solvent containing water in an amount less than, or equal to, that in the removed solvent may be added to the reaction system. Preferably, the alginic acid or the like to serve as the material has a weight-average molecular weight of 3,000 or more.

Preferably, the amount of the alginic acid or the like in the copolymer of the present invention is in the range of 0.1 to 10% by weight, more preferably, in the range of 0.5 to 5% by weight. With the amount falling within this range, the resulting copolymer has high-melt tension and transparency. If the amount of the alginic acid or the like is too small, the melt tension of the resulting copolymer tends to become insufficient, whereas uniformity of the reaction is lost if the amount of the alginic acid or the like is excessively large. The amount of the catalyst used is preferably in the range of 0.0001 to 5% by weight with respect to the amount of lactic acid and the alginic acid or the like, more preferably in the range of 0.001 to 1% by weight in view of economical efficiency.

Specifically, the reaction in this embodiment is carried out in the following manner.

Predetermined amounts of the solvent, L-lactic acid, the alginic acid or the like, and the catalyst are placed in a reactor. The reactor is then heated and the reactants are allowed to react to form oligomer while water is distilled out of the system. Subsequently, a tube filled with the solvent and the desiccating agent such as molecular sieve is connected to the reactor so that the distilled solvent is refluxed through the tube. Alternatively, the distilled solvent may be processed in a separate reactor containing the desiccating agent and is returned to the first reactor. Also, a new supply of solvent containing less water may be added to the reactor. Using any of these techniques, the amount of water in the solvent is maintained at 50 ppm or less and the reaction is continued over several tens of hours to obtain the copolymer of L-lactic acid and the alginic acid or the like having a weight-average molecular weight in the range of 50,000 to 500,000.

Although the weight-average molecular weight of the resulting copolymer is varied depending on the reaction conditions, including the type of the solvent, the type and the amount of the catalyst, reaction temperature, reaction time, and the type of the technique used to process the azeotropically distilled solvent, the copolymer preferably has a weight-average molecular weight in the range from about 50,000 to 100,000. The copolymer with the weight-average molecular weight of less than 50,000 has relatively low tensile strength and stretchability when used in film or other similar applications, as compared to those with large weight-average molecular weights. This copolymer is transparent, has a high-melt tension, and imparts excellent strength and durability to the products made from the copolymer, such as film, filaments, and various molded products. Furthermore, the copolymer has a melt tension more than 10 times as strong as that of polylactic acid and is thus readily processed into foamed products and blown-molded products.

Second Embodiment

2) Reaction of Alginic Acid or the Like, 1,4-butanediol and Succinic Acid.

Predetermined amounts of 1,4-butanediol, succinic acid, the alginic acid or the like and the catalyst are placed in a reactor equipped with a water separator (e.g., Dean Stark trap) along with the solvent. The reactor is heated to azeotropically distill out the solvent and water into the water separator. Excess water above the solubility of the solvent is removed from the system by the water separator, and the solvent, now containing just the amount of water soluble to the solvent, is returned to the reaction system. At this stage, 1,4-butandiol, succinic acid, and the alginic acid or the like together form an oligomer. While the product at this stage typically has a weight-average molecular weight of about 500 to about 1,000, the product with the weight-average molecular weight as large as 5,000 may also be obtained. The time that it takes for the reaction to proceed to this stage is from about 0.5 hours to several hours.

This oligomerization process may be carried out in advance in a separate reactor under reduced pressure and in the absence of solvent or catalyst, or it may be carried out using the solvent but not catalyst. The reaction may then be continued at a temperature that allows the solvent to be distilled while water produced as the reaction proceeds is removed and the solvent saturated with water is returned to the reaction system. Although it depends on the type of the solvent, oligomers with the weight-average molecular weight of 5,000 to 50,000 are obtained after another a few hours of the reaction.

To obtain the polymer with even larger molecular weight, the following processes may be performed:

i) Once water in the reaction system has been distilled substantially completely by the water separator, the water separator is removed and the distilled solvent is refluxed so that it passes through a tube filled with the desiccating agent or the adsorbent for further dehydration.

ii) Once water in the reaction system has been distilled substantially completely by the water separator, the water separator is removed and the distilled solvent is refluxed so that it passes through a separate reactor filled with the desiccating agent or the adsorbent and is then returned to the first reactor for further dehydration.

iii) Once water in the reaction system has been distilled substantially completely by the water separator, the water separator is removed and the reactor is charged with a new supply of the solvent containing less water.

Using any of these techniques, the amount of water dissolved in the solvent is maintained at 50 ppm or less. With the amount of water kept within this range, the reaction is allowed to proceed for additional several tens of hours. As a result, the copolymer with the weight-average molecular weight of 50,000 to 500,000 is obtained, although it depends on the type of the solvent. The resulting copolymer has a high-melt tension and high flexibility.

Third Embodiment

3) Reaction of Alginic Acid or the Like, Polybutylene Succinate and Lactic Acid.

Lactic acid is allowed to undergo dehydration-polycondensation in the presence of catalyst to the weight-average molecular weight of 3,000 or above. The alginic acid or the like is then added to react with the product, followed by addition of polybutylene succinate. The reaction mixture is heated for further dehydration-polycondensation. When it is desired to further increase the molecular weight of the copolymer during the reaction, at least part of the organic solvent may be removed from the system and the organic solvent containing less water than the removed solvent may be added to the reaction system. For that purpose, the distilled solvent may be refluxed so that it passes through a tube filled with the desiccating agent. Preferably, the alginic acid or the like to serve as the material has a weight-average molecular weight of 3,000 or more.

Preferably, the amount of the unit of the alginic acid or the like in the copolymer of the present invention is in the range of 0.1 to 10% by weight, and more preferably, in the range of 0.5 to 5% by weight. With the amount falling within this range, the copolymer can be obtained that has high flexibility, transparency and melt tension among other properties. If the amount of the alginic acid or the like is too small, the melt tension tends to become insufficient, whereas uniformity of the reaction is lost and the resulting copolymer tends to become brittle if the amount of the alginic acid or the like is excessively large. Preferably, polybutylene succinate to serve as the material has a weight-average molecular weight of 10,000 or more.

Preferably, the amount of polybutylene succinate in the copolymer of the present invention is in the range of 3.0 to 51% by weight, and more preferably, in the range of 5.0 to 40% by weight. With the amount falling within this range, the resulting copolymer exhibits high flexibility and transparency. If the amount of polybutylene succinate is too small, the softness, ductility, plasticity, or flexibility of the resulting copolymer tends to be insufficient whereas the transparency is reduced if the amount is too large. The amount of the catalyst used is preferably in the range of 0.0001 to 5% by weight, more preferably in the range of 0.001 to 1% by weight with respect to the amount of lactic acid and the alginic acid or the like in view of economical efficiency.

Specifically, the reaction is carried out in the following manner. Predetermined amounts of the solvent, L-lactic acid, and the catalyst are placed in a reactor, which is then heated to allow L-lactic acid to form oligomers while water is distilled out of the system. Subsequently, alginic acid and polybutylene succinate are added and a tube filled with the solvent and the desiccating agent such as molecular sieves is connected to the reactor so that the distilled solvent is refluxed through the tube. Alternatively, the distilled solvent may be processed in a separate reactor containing the desiccating agent and is returned to the first reactor. Further, a new supply of solvent containing less water may be added to the reactor. Using any of these techniques, the amount of water in the solvent is maintained at 50 ppm or less and the reaction is continued over several tens of hours to obtain the copolymer of L-lactic acid, the alginic acid, and polybutylene succinate having a weight-average molecular weight in the range of 50,000 to 500,000.

[Processes After Condensation Polymerization]

The copolymer produced in accordance with the present invention can be isolated by using any publicly known method that permits collection of reaction products at a desired purity. In one specific example of the method for isolating the copolymer from the reaction solution, subsequent to the completion of the reaction, an excess amount of a poor solvent (such as isopropyl alcohol) is added to the reaction solution with the reaction products dissolved therein at a proper temperature so as to crystallize the reaction products. The crystallized reaction products are then isolated through decantation or filtration, are washed thoroughly with a poor solvent incapable of dissolving the crystal, and are then dried.

In the reaction in accordance with the present invention, when the condensation is carried out in the presence of the catalyst, the catalyst remains in the resulting copolymer. The catalyst remaining in the resulting copolymer may adversely affect the heat-stability and weather resistance and are thus preferably removed from the copolymer. In one example of the method for removing the catalyst, the copolymer obtained in the form of a powder-like solid by cooling the polymerization reaction solution is brought into contact with an acidic substance in the presence of a hydrophilic organic solvent with or without stirring the solution.

Examples of the hydrophilic organic solvent used in this method include alcohols, such as methanol, ethanol, isopropanol, and butanol; ketones, such as acetone and methyl ethyl ketone; ethers, such as tetrahydrofuran, dioxane, and methyl t-butylether; carboxylic acids, such as acetic acid and butyric acid; nitrites such as acetonitrile; and amides, such as N,N-dimethylformamide, N,N-dimethylacetamide, 1,3-dimethylimidazolidinone, and hexamethylphosphoramide. These organic solvents may be used either independently or in combination. Of these, alcohols are particularly preferred since they are generally inexpensive and are incapable of dissolving the copolymer.

Examples of the acidic substance include inorganic acids, such as hydrochloric acid, sulfuric acid, nitric acid, and phosphoric acid, and organic acids, such as acetic acid and p-toluenesulfonic acid. These substances may be used either individually or in combination. Of these substances, particularly preferred are hydrochloric acid, sulfuric acid, and nitric acid, which are generally inexpensive.

The solid copolymer may take any shape for the purpose of being subjected to the process for removing the catalyst. For example, the solid copolymer to be subjected to the process for removing the catalyst may be provided in the forms of powders, granules, grains, flakes, blocks, and lyophilized form. The solid copolymer to be subjected to the process for removing the catalyst may be of any bulk density.

In treating the copolymer with the acidic substance to remove the catalyst, the proportion by weight of the copolymer is preferably from about 3 to about 40% by weight with respect to the total weight of the hydrophilic organic solvent and the copolymer. Preferably, the copolymer is treated with the acidic substance for removal of the catalyst at a temperature of 0 to 100° C., more preferably at a temperature of 0 to 60° C. Preferably, the copolymer is treated with the acidic substance for removal of the catalyst over a time period of about 0.1 to about 24 hours, more preferably over a time period of about 0.5 to about 8 hours.

[Copolymer Resin Composition]

The copolymer obtained through the above-described steps is a copolymer in which the alginic acid or the like is bound to lactic acid via ester bonds formed when at least one carboxyl group of the alginic acid or the like reacts with a hydroxyl group of lactic acid and a hydroxyl group of alginic acid or the like reacts with a carboxyl group of lactic acid. The weight-average molecular weight of the copolymer is preferably in the range of about 50,000 to 300,000 although it is varied depending on the reaction conditions, including the type of the solvent, the type and the amount of the catalyst, reaction temperature, reaction time, and the type of the technique used to process the azeotropically distilled solution. The resulting copolymer exhibits a high strength, durability, transparency and flexibility when made into film, filaments, and molded products. Further, the resulting copolymer can readily be processed into foamed products and blow-molded products since it has a significant melt tension of 0.7 g or above when the melt-flow index is 10 g/10 min.

The weight-average molecular weight and the distribution of molecular weight of the copolymer obtained in accordance with the present invention can be controlled in a desired manner by properly selecting conditions for the reaction, including presence or absence of the solvent, the type of the solvent, presence or absence of the catalyst, the type of the catalyst, reaction temperature, reaction time, the type of the technique used to process the azeotropically distilled solvent, and degree of dehydration of the solvent in the reaction system. Having a weight-average molecular weight of 50,000 or more, the copolymer in accordance with the present invention exhibits high workability upon processing into molded products, such as film, blown bottles, and foamed products, which will be described later.

According to the process of the present invention, a copolymer is provided that has a higher melt tension than the typical polyhydroxycarboxylic acid. Because of the high tension that the copolymer exhibits when melted, reduction in the film width occurring during the production of T-die extruded film, which is caused by sagging or "necking in" of the melted film material and normally poses a problem, is reduced. As a result, forming of film is facilitated. In addition, the copolymer has another advantage that it makes it easier to obtain a highly foamed material than when the typical polyhydroxycarboxylic acid is used. Moreover, the copolymer facilitates the direct blow action during a blow-molding process and also facilitates vacuum molding of the products from sheets because of reduced sagging of the heated sheets. By reacting a hydroxycarboxylic acid or a polyhydroxycarboxylic acid with a polysaccharide and further reacting with the product an aliphatic polyester obtained through the reaction of an aliphatic polycarboxylic acid with an aliphatic polyol according to the process of the present invention, a copolymer can be obtained that is flexible, transparent and has a high melt tension.

When an ion-exchanged alginic acid or the like is used to serve as the alginic acid or the like in the present invention, the resulting copolymer has a significantly reduced crystallization rate even if the polyhydroxycarboxylic acid, like poly-L-lactic acid, inherently has the ability to crystallize. In applications such as certain types of molded products where transparency is given priority over other properties, the copolymer used must maintain its uncrystallized state. When subjected to a high temperature, high moisture environment, however, the copolymer crystallizes to lose the transparency of the molded products. The copolymer as described above can mitigate such a problem. This copolymer can also eliminate a problem associated with the production of biaxially-stretched film. That is, once the film is stretched in one direction, the crystallization temperature of the film is lowered, making it difficult to stretch the film in another direction. The copolymer obtained in accordance with the present invention serves as a suitable material for various molding processes, including injection molding, extrusion molding, calender molding, blow molding, balloon molding, hollow molding, vacuum molding, and foaming. The copolymer obtained in accordance with the present invention is particularly suited for use in some of the above processes that require strength for the melted polymer, such as blow molding, foam molding, and extrusion molding. In producing sheets through extrusion molding, for example, the copolymer of the present invention, having a high melt tension, helps reduce sagging of the melted sheets and reduction in the sheet width caused by "necking in" of the sheet.

[Applications]

Applications of the copolymer obtained in accordance with the present invention are now described in detail in the following. The copolymer of the present invention can be shaped through a proper process to suit various applications, including parts for writing tools such as ballpoint pens, mechanical pencils and pencils, parts for stationery, golf tees, parts for smoking golf ball used in ceremonial first shot, capsules for orally ingestible medication, carriers for suppository for rectal or vaginal administration, carriers for medical patches applied to skin or mucous membrane, capsules for agrichemicals, capsules for fertilizers, capsules for seed and seedlings, compost bags, fishing reels, fishing dobbers, lures for fishery, lures, buoys for fishery, decoys for hunting, shells for shot gun pellets, camping goods such as plates and utensils, nails, stakes, bundling materials, anti-slip materials for use in muddy or snowy roads, and building blocks.

Aside from the applications described above, the copolymer of the present invention can be shaped through a proper process to suit various other applications, including lunch boxes, plates and utensils, containers for lunch and prepared side dishes sold in convenience stores, chopsticks, disposable chopsticks, forks, spoons, skewers, toothpicks, containers for instant noodles, cups for use in beverage vending machines, containers and trays for groceries such as raw fish, fresh meet, fruits, tofu and prepared side dishes, "torohbako" containers (fish containers) for use in fish market, bottles and cans for daily products such as milk, yogurt and lactobacillus beverages, bottles and cans for soft drinks such as soda pop, bottles and cans for alcohol beverages such as beer and whiskey, bottles for shampoo and liquid soap with or without dispenser mechanism, toothpaste tubes, containers for cosmetics, containers for detergents, containers for bleaches, cooler boxes, plant pots, casings for water purifier cartridges, casings for artificial kidneys and livers, materials for syringes, cushionings for use in transporting electronic home appliances such as television and stereo sets, cushionings for use in transporting precision machines such as computers, printers and clocks, cushionings for use in transporting optical instruments such as cameras, eyeglasses, microscopes and telescopes, and cushionings for use in transporting ceramic products such as glass, china and porcelain.

The copolymer obtained in accordance with the present invention serves as a suitable material for the production of film and sheets. Film and sheets containing the copolymer of the present invention can be produced through various techniques including publicly known extrusion technique, coextrusion technique, calender technique, hot-press technique, solvent casting technique, inflation technique, balloon technique, and Tenter technique. In processing the copolymer of the present invention into film or sheets using extrusion, publicly known dies may be used, including T-dies, inflation dies (circular dies), flat dies, feed block/single manifold dies, and single manifold dies, which each consist of several feed blocks. The coextrusion technique may also be used, which permits production of multi-layered film using different types of the polymer of the invention having different properties and/or the polymer of the present invention in combination with other polymers.

Each of the inflation technique and the balloon technique enables one to simultaneously stretch the material along two different axes. In this manner, products of considerable robustness having low stretchability, high elasticity and high strength can be obtained in a highly productive, relatively inexpensive manner. Since the products produced using these techniques have a seamless, generally pouch-like shape, the techniques are suitable for the production of pouches and bags, including shopping bags for use in supermarkets, bags used for keeping dews formed on packages of chilled food, such as meet or frozen foods, from wetting surroundings, and compost bags. The copolymer of the present invention may be used in conjunction with the coextrusion technique to produce, in a highly productive manner, multi-layered film composed of different types of the degradable copolymer of the present invention having different properties and/or the polymer of the present invention in combination with other polymers. The inflation technique or the balloon technique may be used in conjunction with the coextrusion technique.

The film or the sheet including the copolymer obtained in accordance with the present invention is also suitable for the purpose of secondary processing, which is performed by stretching, blowing or vacuum molding to impart two-dimensional or three-dimensional shapes to the products. The film or the sheet including the copolymer of the present invention is suitably used to produce shopping bags, garbage bags, compost bags, cement bags, fertilizer bags, film for packaging food and sweets, film for wrapping food, film for agricultural or gardening use, film for use in greenhouses, film for packaging magnetic cassette tape products for VCR or audio cassette players, film for packaging flexible disks, fences, oil fences for use in the sea, rivers and lakes, adhesive tapes, tapes, bundling materials, waterproof sheets, umbrellas, tents, sandbags, cement bags, and fertilizer bags.

In addition, perforated, air-breathable film can be obtained by stretching extruded film made of the polymer containing inorganic compounds such as calcium carbonate, barium sulfate, and titanium oxide. Such film can be used to form diaper covers and special wrapping materials. Seamless pipes containing the copolymer of the present invention can be produced by extrusion through a circular die. Multi-layered seamless pipes using different types of the degradable copolymer of the present invention and/or other types of polymers may also be produced by using the copolymer of the present invention in conjunction with the coextrusion technique. Extrusion through a die permits the production of elongate materials containing the copolymer of the present invention that have either round- or square-shaped cross-section. The copolymer of the present invention may be used in conjunction with the coextrusion technique to produce elongate materials that use different types of the degradable copolymer of the present invention and/or other types of polymers and have a multi-layered cross-section, which is either round- or square-shaped. This combination with the coextrusion technique permits the production of elongate materials with either round- or square-shaped cross-section that have a uniform, layered cross-sectional structure along the length.

Also, film and sheets that contain the degradable copolymer of the present invention and have desired physical properties, gas-barrier property, optical characteristics, wavelength spectrum of the transmitted light, light-blocking property, oil-resistance and other properties can be produced by properly selecting additives (e.g., antioxidant, heat stabilizer, UV stabilizer, lubricant, filler, anti-adhesion agent, anti-static agent, surface-wettability improving agent, combustion promoting agent, anti-slip agent, pigments and other agents), conditions for extrusion, and conditions for stretching. In processing the copolymer of the present invention into film or sheets, the film or the sheet may be subjected to various post-treatments or finishing processes, including welding, heat-seal, perforation, primer coating, adhesive coating, drug coating, parkerizing, vapor deposition, sputtering, CVD, coating, etching, spraying, staining, painting, electrostatic coating, airbrushing, laminate, sandwiching, embossing, relief engraving, stamping, corrugation, printing, transferring, sanding, sand blasting, shirring, punching, making honeycomb structure, making corrugated fiberboard structure, and multi-layered structure.

Depending on the purpose, publicly known method may be employed in the post-treatment or the finishing process, including calendering, extrusion, screen printing, gravure printing, relief printing, intaglio printing, doctor blade, immersion, spraying, airbrushing, and electrostatic coating. The film or the sheet including the copolymer of the present invention may be constructed as a multi-layered structure by laminating or sticking the film or the sheet onto a sheet made of other materials such as paper or other polymers.

As previously described, the copolymer in accordance with the present invention has a significantly large melt tension and is therefore suitable for the production of foamed products. As used herein, the foamed product is meant to encompass dual- or multi-phase resin structures, which consist of a continuous resin phase containing numerous empty spaces (including air bubbles, voids, microvoids and cavities) and thus having a relatively small apparent density and an empty-space phase (either continuous or isolated) scattered across the continuous resin phase. Examples of the structure of the foamed material generally include polymer structures having cells, foamed polymer structures, expanded polymer structures, polymer foam structures, and polymer foam. The foamed product may be either soft or hard.

The foamed product containing the copolymer of the present invention may be produced by using publicly known methods such as gas-injection foaming and bead foaming. Depending on the purpose, the characteristics of the empty space of the foamed product (including air bubbles, voids, microvoids, and cavities) such as continuity, degree of isolation, size, shape, distribution, and size uniformity can be controlled by properly setting conditions for foaming. Examples of foaming agent for producing the foamed product include inert gases, chemical foaming agents capable of generating inert gas upon degradation, hydrocarbons or chlorinated hydrocarbons having 3 to 5 carbon atoms, fluorocarbons, Freon, water, nitrogen, LPG, LNG, organic liquids having low boiling points, carbon dioxide, and ammonium. Examples of the chemical foaming agents include sodium hydrogen carbonate, dinitrosopentamethylenetetramine, sulfonyl hydrazide, azodicarbonamide, p-toluenesulfonyl semicarbazide, 5-phenyltetrazole, diisopropylhydrazodicarboxylase, 5-phenyl-3,6-dihydro-1,3,4-oxadiazine-2-one, and sodium borohydride.

Examples of physical foaming agent include pentanes such as n-pentane, 2,2-dimethylpropane, and 1-pentene, hexanes such as n-hexane, 2-methylpentane, 3-methylpentane, 2,2-dimethylbutane, and cyclohexane, heptanes such as n-heptane, 2,2-dimethylpentane, 2,3-dimethylpentane, 3-ethylpentane, and 1-heptene, toluene, trichloromethane, tetrachloromethane, trichlorofluoromethane, methanol, 2-propanol, isopropyl ether, and methyl ethyl ketone. Examples of fluorocarbon include fluorocarbons of a series of CFCs, such as CFC-11, CFC-12, CFC-113, and CFC-114. Examples of chlorofluorocarbon (CFC) alternative include HCFC-141a, HCFC-142b, HFC-134a, HCFC-141b, HCFC-22, CFC-1113, HFC-32, HFC-125, HCFC-124, HFC-125, HFC-152a, HCFC-123, and HFC-4310.

The foamed product containing the copolymer of the present invention is suitable for use in various applications, including lunch boxes, plates and utensils, containers for lunch and prepared side dishes sold at convenience stores, cups for instant noodles, cups for use in beverage vending machines, containers and trays for groceries such as raw fish, fresh meet, fruits, tofu, fermented soybeans and prepared side dishes, "toroh-bako" containers (fish containers) for use in fish market, containers for daily products such as milk, yogurt and lactobacillus beverages, containers for soft drinks such as soda pop, containers for alcohol beverages such as beer and whiskey, containers for cosmetics, containers for detergents, containers for bleaches, cooler boxes, plant pots, tape, cushionings for use in transporting electronic home appliances such as television and stereo sets, cushionings for use in transporting precision machines such as computers, printers and clocks, cushionings for use in transporting optical instruments such as cameras, eyeglasses, microscopes and telescopes, cushionings for use in transporting ceramic products such as glass, china and porcelain, light-blocking materials, heat insulator, and sound-proof materials.

The foamed product containing the copolymer of the present invention is suitable for use in medical or hygiene applications. Examples include bandage, carriers for medical patches applied to skin or mucous membrane, sling, adhesive plaster, towel, disposable towel, disposable wet towel, washcloth for use in bars and restaurants, damp cloth, tissue, wet wipe tissue for cleaning/antiseptic purposes, wet tissue for baby wipe purpose, disposable diaper, sanitary napkin, sanitary tampon, tampon for use in surgical procedures, child births and blood absorbing purposes, sanitary cover stock material, and sterilized bag.

Before packaged aseptically, these medical or hygiene products may be sterilized or sanitized using publicly known sterilization techniques, such as heat or steam sterilization, sterilization by gaseous ethylene oxide, sterilization by hydrogen peroxide and ozone, sterilization by exposure to UV or electromagnetic waves, sterilization by exposure to radioactive rays such as gamma ray, and sterilization using disinfectants such as ethanol and benzalkonium chloride.

Also, these products may be manufactured and packaged aseptically and/or in a manner that prevents contamination with endotoxins by placing the processing line in a clean bench or a clean room in which laminar flow of super clean air is supplied through a HEPA filter.

The foamed product containing the copolymer of the present invention is suitably used in various industrial applications, including agriculture, fishery, forestry, industry, civil engineering and construction, and transportation, as well as in various recreational applications, including leisure and sports. For example, the foamed product is suitable for use in applications such as butter muslin for agricultural use, oil absorbent, reinforcement for soft ground, artificial leather, linings for flexible disks, sandbags, heat insulator, sound-proof materials, cushionings, cushionings for furniture such as beds and chairs, floor cushionings, packaging materials, bundling materials, and anti-slip materials for use in muddy or snowy roads.

EXAMPLES

Example 1

While stirred, a mixture of 89.3 g 90% L-lactic acid, 1.9 g alginic acid with a weight-average molecular weight of 7,800, 300 g diphenylether, and 0.37 g tin powder was heated for oligomerization for 3 hours at 130° C./50 mmHg and for another 3 hours at 130° C./30 mmHg with water being distilled out of the system. Subsequently, a Dean Stark trap was attached and the mixture was azeotropically dehydrated for 8 hours at 140° C./24 mmHg. The Dean Stark trap was then disconnected and a tube containing 50 g of molecular sieves 3A along with 73.0 g of diphenylether containing 10 ppm or less water was attached instead to allow the solvent distilled during the refluxing to be returned to the system through the molecular sieve layer. While stirred, the mixture was heated for 9 hours at 130° C./13 mmHg for reaction in a manner that permits no water into the system. The amount of water present in the solvent after it passed through the molecular sieves was 2 ppm. To the reaction solution, 800 ml of 0.7% hydrochloric acid/isopropyl alcohol solution was added, and the mixture was stirred for 1 hour and was then subjected to vacuum filtration. This process was repeated twice to remove tin powder. 600 ml isopropyl alcohol was added to the filtration residue, and the mixture was stirred and subjected to vacuum filtration. This process was repeated until the filtrate became neutral. The residue was then washed with hexane and was air-dried with a stream of hot air to obtain a copolymer. The resulting copolymer had a weight-average molecular weight of 100,000. A differential thermal analysis of the copolymer revealed that it had a glass-transition temperature of 58.1° C. and a melting point of 156.4° C.

Example 2

While stirred, a mixture of 178.6 g 90% L-lactic acid, 1.3 g alginic acid with a weight-average molecular weight of 7,800, and 0.74 g tin powder was heated for oligomerization for 3 hours at 130° C./50 mmHg and for another 2 hours at 130° C./30 mmHg with water being distilled out of the system. Subsequently, 300 g of o-dichlorobenzene containing 10 ppm or less water was added to the mixture, and a tube containing 70 g of molecular sieves 3A and 96.5 g of o-dichlorobenzene containing 10 ppm or less water was attached to allow the solvent distilled out during the refluxing process to be returned to the system through the molecular sieve layer. While stirred, the mixture was heated for 10 hours at 140° C./250 mmHg for reaction in such a manner that permits no water into the system. The amount of water present in the solvent after it passed through the molecular sieves was 2 ppm. To the reaction solution, 800 ml of 0.7% hydrochloric acid/isopropyl alcohol solution was added, and the mixture was stirred for 1 hour and was then subjected to vacuum filtration. This process was repeated twice to remove tin powder. 600 ml isopropyl alcohol was added to the filtration residue, and the mixture was stirred and subjected to vacuum filtration. This process was repeated until the filtrate becomes neutral. The residue was then washed with hexane. Subsequently, the residue was air-dried at 60° C. with a stream of hot air to obtain a copolymer. The resulting copolymer had a weight-average molecular weight of 100,000. A differential thermal analysis of the copolymer revealed that it had a glass-transition temperature of 57.5° C. and a melting point of 159.1° C.

Example 3

While stirred, a mixture of 89.3 g 90% L-lactic acid, 300 g diphenylether, and 0.37 g tin powder was heated for 3 hours at 130° C./50 mmHg and for another 3 hours at 130° C./30 mmHg with water being distilled out of the system. The polymer had a weight-average molecular weight of 5,000 during the reaction. 0.6 g alginic acid with the weight-average molecular weight of 6,000 was added to the mixture. A Dean Stark trap was attached, and the mixture was azeotropically dehydrated for 8 hours at 140° C./24 mmHg. The Dean Stark trap was then disconnected and a tube containing 50 g of molecular sieves 3A and 73.0 g of diphenylether containing 10 ppm or less water was attached in place to allow the solvent distilled out during the refluxing to be returned to the system through the molecular sieve layer. While stirred, the mixture was heated for 20 hours at 130° C./15 mmHg for reaction in such a manner that permits no water into the system.

The amount of water present in the solvent after it passed through the molecular sieves was 2 ppm. The reaction mixture was then allowed to cool to 30° C., followed by the addition of an 800 ml 0.7% hydrochloric acid/isopropyl alcohol solution. The mixture was stirred for 1 hour and was then subjected to vacuum filtration. This process was repeated twice to remove tin powder. 600 ml isopropyl alcohol was added to the filtration residue, and the mixture was stirred and subjected to vacuum filtration. This process was repeated until the filtrate becomes neutral. The residue was then washed with hexane. Subsequently, the residue was air-dried at 60° C. with a stream of hot air to obtain a copolymer. The resulting copolymer had a weight-average molecular weight of 120,000. A differential thermal analysis of the copolymer revealed that it had a glass-transition temperature of 58.1° C. and a melting point of 156.4° C.

Example 4

While stirred, a mixture of 89.3 g 90% L-lactic acid, 300 g diphenylether, and 0.37 g tin powder was heated for 3 hours at 130° C./50 mmHg and for another 3 hours at 130° C./30 mmHg with water being distilled out of the system. The polymer in the reaction mass had a weight-average molecular weight of 5,000. 1.9 g sodium alginate with the weight-average molecular weight of 10,000 was added to the mixture. A Dean Stark trap was attached, and the mixture was azeotropically dehydrated for 8 hours at 140° C./24 mmHg. The Dean Stark trap was then disconnected and a tube containing 50 g of molecular sieves 3A and 73.0 g of diphenylether containing 10 ppm or less water was attached in place to allow the solvent distilled out during the refluxing to be returned to the system through the molecular sieve layer. While stirred, the mixture was heated for 20 hours at 130° C./15 mmHg for reaction in such a manner that permits no water into the system.

The amount of water present in the solvent after it passed through the molecular sieves was 2 ppm. The reaction mixture was then allowed to cool to 30° C., followed by the addition of an 800 ml 0.7% hydrochloric acid/isopropyl alcohol solution. The mixture was stirred for 1 hour and was then subjected to vacuum filtration. This process was repeated twice to remove tin powder. 600 ml isopropyl alcohol was added to the filtration residue, and the mixture was stirred and subjected to vacuum filtration. This process was repeated until the filtrate becomes neutral. The residue was then washed with hexane. Subsequently, the residue was air-dried at 60° C. with a stream of hot air to obtain a copolymer. The resulting copolymer had a weight-average molecular weight of 120,000. A differential thermal analysis of the copolymer revealed that it had a glass-transition temperature of 57.6° C. and a melting point of 156.0° C.

Example 5

While stirred, a mixture of 89.3 g of 90% L-lactic acid and 0.37 g of tin powder was heated for 3 hours at 130° C./50 mmHg and for another 2 hours at 130° C./30 mmHg with water being distilled out of the system. Subsequently, 300 g of o-dichlorobenzene was added to the mixture, and a Dean Stark trap was attached. The mixture was then azeotropically dehydrated for 8 hours at 140° C./250 mmHg. The polymer present in the reaction mass after azeotropic dehydration had a weight-average molecular weight of 96,000. 0.6 g of sodium alginate with the weight-average molecular weight of 10,000 was added to the mixture. The Dean Stark trap was disconnected and a tube containing 50 g of molecular sieves 3A and 73.0 g of o-dichlorobenzene was attached in place to allow the solvent distilled out during the refluxing to be returned to the system through the molecular sieve layer. While stirred, the mixture was heated for 20 hours at 130° C./180 mmHg for reaction in such a manner that permits no water into the system.

The amount of water present in the solvent after it passed through the molecular sieves was 2 ppm. The reaction mixture was then allowed to cool to 30° C., followed by the addition of an 800 ml 0.7% hydrochloric acid/isopropyl alcohol solution. The mixture was stirred for 1 hour and was then subjected to vacuum filtration. This process was repeated twice to remove tin powder. 600 ml isopropyl alcohol was added to the filtration residue, and the mixture was stirred and subjected to vacuum filtration. This process was repeated until the filtrate becomes neutral. The residue was then washed with hexane. Subsequently, the residue was air-dried at 60° C. with a stream of hot air to obtain a copolymer. The resulting copolymer had a weight-average molecular weight of 130,000. A differential thermal analysis of the copolymer revealed that it had a glass-transition temperature of 58.0° C. and a melting point of 156.3° C.

Example 6

While stirred, a mixture of 89.3 g 90% L-lactic acid and 0.37 g tin powder was heated for oligomerization for 3 hours at 130° C./50 mmHg and for another 3 hours at 130° C./30 mmHg with water being distilled out of the system. Subsequently, 300 g of o-dichlorobenzene was added to the mixture, and a Dean Stark trap was attached. The mixture was then azeotropically dehydrated for 8 hours at 140° C./250 mmHg. The Dean Stark trap was then disconnected and a tube containing 50 g of molecular sieves 3A and 73.0 g of o-dichlorobenzene containing 10 ppm or less water was attached in place to allow the solvent distilled out during the refluxing to be returned to the system through the molecular sieve layer. While stirred, the mixture was allowed to undergo reaction for 8 hours at 130° C./180 mmHg for reaction in such a manner that permits no water into the system. The polymer had a weight-average molecular weight of 3,000. 0.6 g of alginic acid with the weight-average molecular weight of 6,000 was added to the mixture and the mixture was allowed to undergo reaction for additional 15 hours at 130° C./180 mmHg.

The amount of water present in the solvent after it passed through the molecular sieves was 2 ppm. The reaction mixture was then allowed to cool to 30° C., followed by the addition of an 800 ml 0.7% hydrochloric acid/isopropyl alcohol solution. The mixture was stirred for 1 hour and was then subjected to vacuum filtration. This process was repeated twice to remove tin powder. 600 ml isopropyl alcohol was added to the filtration residue, and the mixture was stirred and subjected to vacuum filtration. This process was repeated until the filtrate becomes neutral. The residue was then washed with hexane. Subsequently, the residue was air-dried at 60° C. with a stream of hot air to obtain a copolymer. The resulting copolymer had a weight-average molecular weight of 150,000. A differential thermal analysis of the copolymer revealed that it had a glass-transition temperature of 57.5° C. and a melting point of 157.0° C.

Example 7

A reactor was used that was equipped with a stirrer, a vacuum line, a heater for controlling temperature, and a solvent reflux line to be connected to a tube filled with molecular sieve 5A. 22.9 g ethylene glycol, 35.4 g succinic acid, 0.427 g alginic acid with a weight-average molecular weight of 6,500, and 0.216 g metallic tin were placed in the reactor. Polymerization reaction was allowed to proceed for 7 hours at 150° C. under atmospheric pressure, followed by another 4 hours at 150° C./10 mmHg, followed by additional 4 hours at 150° C./4 mmHg while water was being distilled out of the system. Subsequently, 129.7 g diphenylether was added to the reaction system and a tube filled with 20 g of molecular sieve 5A was connected to the reactor, so that the distilled solvent would pass through the molecular sieve layer and was refluxed to the reactor. The reaction was then allowed to proceed for the subsequent 45 hours at 130° C./15 mmHg.

After the reaction was completed, 500 ml chloroform was added to the reaction system to dissolve the materials. The resulting solution was filtered and the filtrate was added to 5.5L acetone to re-precipitate the dissolved material. The precipitated solid material was filtered and collected as filtration residue. To the filtration residue, 600 ml of 1% hydrochloric acid/isopropyl alcohol solution was added, and the mixture was stirred for 1 hour and was then subjected to vacuum filtration to remove dissolved tin. To the filtration residue having the tin component removed therefrom, 600 ml of fresh isopropyl alcohol was added, and the mixture was thoroughly stirred, followed by vacuum filtration. This washing process was repeated until the filtrate became neutral. After washing, the residue was air-dried at 60° C. by a stream of hot air to obtain a polymer, which had a weight-average molecular weight of 80,000.

Example 8

The same reactor as that used in Example 7 was used. 41.0 g 1,4-butanediol, 53.1 g succinic acid, and 0.774 g tin (II) oxide were placed in the reactor. Polymerization reaction was allowed to proceed for 2.5 hours at 150° C. under atmospheric pressure, followed by additional 0.5 hours at 150° C./15 mmHg while water was being distilled from the system. Subsequently, 232 g o-dichlorobenzene was added to the reaction system and a tube filled with 20 g of molecular sieve 5A was connected to the reactor, so that the distilled solvent would pass through the molecular sieve layer and was refluxed to the reactor. Subsequently, the reaction was allowed to proceed for 7 hours at 110° C./100 mmHg. 0.782 g of sodium alginate with the weight-average molecular weight of 10,000 was then added to the reactor and the reaction was allowed to proceed for 15 hours at 110° C./100 mmHg.

After the reaction was completed, 465 g o-dichlorobenzene was added to the reaction system for crystallization. The crystallized material was filtered and collected as filtration residue. To the filtration residue, 600 ml of 1% hydrochloric acid/isopropyl alcohol solution was added, and the mixture was stirred for 1 hour and was then subjected to vacuum filtration to remove dissolved tin. To the residue having the tin component removed, 600 ml of fresh isopropyl alcohol was added, and the mixture was thoroughly stirred, followed by vacuum filtration. This washing process was repeated until the filtrate became neutral. After washing, the residue was air-dried at 60° C. by a stream of hot air to obtain a polymer.

Example 9

While stirred, a mixture of 89.3 g 90% L-lactic acid, 1 g pectin with the weight-average molecular weight of 3,000, 300 g diphenylether, and 0.37 g tin powder was heated for oligomerization for 3 hours at 130° C./50 mmHg, followed by additional 3 hours at 130° C./30 mmHg with water being distilled out of the system. Subsequently, a Dean Stark trap was attached and the mixture was azeotropically dehydrated for 8 hours at 140° C./24 mmHg. The Dean Stark trap was then disconnected and a tube containing 50 g of molecular sieves 3A and 73.0 g of diphenylether containing 10 ppm or less water was attached instead to allow the solvent distilled during the refluxing to be returned to the system through the molecular sieve layer. While stirred, the mixture was heated for 9 hours at 130° C./13 mmHg for reaction in such a manner that permits no water into the system. The amount of water present in the solvent after it passed through the molecular sieves was 2 ppm. To the reaction solution, 800 ml of 0.7% hydrochloric acid/isopropyl alcohol solution was added, and the mixture was stirred for 1 hour and was then subjected to vacuum filtration. This process was repeated twice to remove tin powder. 600 ml isopropyl alcohol was added to the filtration residue, and the mixture was stirred and subjected to vacuum filtration. This process was repeated until the filtrate became neutral. The residue was then washed with hexane and was air-dried with a stream of hot air to obtain a copolymer. A differential thermal analysis of the resulting copolymer revealed that it had a glass-transition temperature of 59° C. and a melting point of 158° C.

Example 10

While stirred, a mixture of 89.3 g 90% L-lactic acid, 1.2 g mannuronic acid, 300 g diphenylether, and 0.37 g tin powder was heated for oligomerization for 3 hours at 130° C./50 mmHg, followed by additional 3 hours at 130° C./30 mmHg with water being distilled out of the system. Subsequently, a Dean Stark trap was attached and the mixture was azeotropically dehydrated for 8 hours at 140° C./24 mmHg. The Dean Stark trap was then disconnected and a tube containing 50 g of molecular sieves 3A and 73.0 g of diphenylether containing 10 ppm or less water was attached instead to allow the solvent distilled during the refluxing to be returned to the system through the molecular sieve layer. While stirred, the mixture was heated for 9 hours at 130° C./13 mmHg for reaction in such a manner that permits no water into the system. The amount of water present in the solvent after it passed through the molecular sieves was 2 ppm. To the reaction mixture, an 800 ml 0.7% hydrochloric acid/isopropyl alcohol solution was added. The mixture was stirred for 1 hour and was then subjected to vacuum filtration. This process was repeated twice to remove tin powder. 600 ml isopropyl alcohol was added to the filtration residue, and the mixture was stirred and subjected to vacuum filtration. This process was repeated until the filtrate becomes neutral. The residue was then washed with hexane and was air-dried with a stream of hot air. A differential thermal analysis of the resulting copolymer revealed that it had a glass-transition temperature of 58° C. and a melting point of 158° C.

Example 11

While stirred, a mixture of 89.3 g 90% L-lactic acid, 1 g guluronic acid, 300 g diphenylether, and 0.37 g tin powder was heated for oligomerization for 3 hours at 130° C./50 mmHg and for another 3 hours at 130° C./30 mmHg with water being distilled out of the system. Subsequently, a Dean Stark trap was attached and the mixture was azeotropically dehydrated for 8 hours at 140° C./24 mmHg. The Dean Stark trap was then disconnected and a tube containing 50 g of molecular sieves 3A along with 73.0 g of diphenylether containing 10 ppm or less water was attached instead to allow the solvent distilled during the refluxing to be returned to the system through the molecular sieve layer. While stirred, the mixture was heated for 9 hours at 130° C./13 mmHg for reaction in such a manner that permits no water into the system. The amount of water present in the solvent after it passed through the molecular sieves was 2 ppm. To the reaction solution, 800 ml of 0.7% hydrochloric acid/isopropyl alcohol solution was added, and the mixture was stirred for 1 hour and was then subjected to vacuum filtration. This process was repeated twice to remove tin powder. 600 ml isopropyl alcohol was added to the filtration residue, and the mixture was stirred and subjected to vacuum filtration. This process was repeated until the filtrate became neutral. The residue was then washed with hexane and was air-dried with a stream of hot air to obtain a copolymer. A differential thermal analysis of the resulting copolymer revealed that it had a glass-transition temperature of 58° C. and a melting point of 157° C.

Example 12

A reactor was used that was equipped with a stirrer, a vacuum line, a heater for controlling temperature, and a solvent reflux line to be connected to a tube filled with molecular sieve 5A. 22.9 g diethylene glycol, 35.4 g oxalic acid, 0.427 g pectin with a weight-average molecular weight of 3,000, and 0.216 g metallic tin were placed in the reactor. Polymerization reaction was allowed to proceed for 7 hours at 150° C. under atmospheric pressure, followed by another 4 hours at 150° C./10 mmHg, followed by additional 4 hours at 150° C./4 mmHg while water was being distilled out of the system. Subsequently, 129.7 g diphenylether was added to the reaction system and a tube filled with 20 g of molecular sieve 5A was connected to the reactor, so that the distilled solvent would pass through the molecular sieve layer and was refluxed to the reactor. The reaction was then allowed to proceed for the subsequent 45 hours at 130° C./15 mmHg.

After the reaction was completed, 500 ml chloroform was added to the reaction system to dissolve the materials. The resulting solution was filtered and the filtrate was added to 5.5L acetone to re-precipitate the dissolved material. The precipitated solid material was filtered and collected as filtration residue. To the filtration residue, 600 ml of 1% hydrochloric acid/isopropyl alcohol solution was added, and the mixture was stirred for 1 hour and was then subjected to vacuum filtration to remove dissolved tin. To the residue having the tin component removed therefrom, 600 ml of fresh isopropyl alcohol was added, and the mixture was thoroughly stirred, followed by vacuum filtration. This washing process was repeated until the filtrate became neutral. After washing, the residue was air-dried at 60° C. by a stream of hot air to obtain a polymer, which had a weight-average molecular weight of 90,000.

Comparative Example 1

While stirred, a mixture of 89.3 g 90% L-lactic acid, 1.9 g acetyl cellulose with a weight-average molecular weight of 30,000 and a substitution degree of 1.5, 300 g diphenylether, and 0.37 g tin powder was heated for oligomerization for 3 hours at 130° C./50 mmHg and for another 3 hours at 130° C./30 mmHg with water being distilled out of the system. Subsequently, a Dean Stark trap was attached and the mixture was azeotropically dehydrated for 8 hours at 140° C./24 mmHg. The Dean Stark trap was then disconnected and a tube containing 50 g of molecular sieves 3A along with 73 g of diphenylether was attached instead to allow the solvent distilled during the refluxing to be returned to the system through the molecular sieve layer. While stirred, the mixture was heated for 9 hours at 130° C./13 mmHg for reaction in a manner that permits no water into the system. To the reaction solution, 800 ml of 0.7% hydrochloric acid/isopropyl alcohol solution was added, and the mixture was stirred for 1 hour and was then subjected to vacuum filtration to remove tin powder. The residue was washed with hexane until the filtrate became neutral and was air-dried to obtain a polymer.

The resulting polymer had a molecular weight of 600,000.

Comparison of Hydrolysis Characteristics

The resin compositions obtained in Examples 1 through 8 and Comparative Example 1 were evaluated for the tendency to hydrolyze. The results are shown in Table 1.

Conditions for Hydrolysis:

2 g sodium hydroxide was placed in each of a plurality of test tubes along with 6 ml methanol. 1 g of the polymer obtained in each experiment was added to each tube, which in turn was placed in a heat bath at 65° C. with the polymer being held against the tube wall with a glass stick. The part of the polymer held in contact with sodium hydroxide was observed. A circle indicates that the polymer degraded under these conditions, whereas a cross indicates that the polymer did not react.

Comparison of Moldability

Using each of the resin compositions obtained in Example 1 and Comparative Example above, 100 μm thick, 10 cm wide film sheets were produced by extrusion.

It turned out that a film sheet as long as 100m could be produced without any defects when the resin composition of Example 1 was used, whereas the film was torn during extrusion when the resin composition of Comparative Example was used.

TABLE 1

| | Weight-average molecular weight | Glass-transition temperature (° C.) | Tendency to hydrolyze |
| --- | --- | --- | --- |
| Example 1 | 100,000 | 58.1 | Good |
| Example 2 | 100,000 | 57.5 | Good |
| Example 3 | 120,000 | 58.1 | Good |
| Example 4 | 120,000 | 57.6 | Good |
| Example 5 | 130,000 | 58.0 | Good |
| Example 6 | 150,000 | 57.5 | Good |
| Example 7 | 80,000 | | Good |
| Example 8 | | | Good |
| Example 9 | | 59.0 | Good |
| Example 10 | | 58.0 | Good |
| Example 11 | | 58.0 | Good |
| Example 12 | 90,000 | | Good |
| Comparative Example | 600,000 | | Not good |

INDUSTRIAL APPLICABILITY

The resin composition of the present invention, which makes use of materials derived from natural objects, is readily hydrolyzed and can thus be degraded from the polymer into monomer to be reused as a polymerization material. Accordingly, the resin composition of the present invention can readily be recycled and is thus suited for the production of various molded products.

What is claimed is:

1. A copolymer resin composition, comprising at least a copolymer obtained through dehydration-polycondensation of:
   (A) at least one monosaccharide having a hydroxyl group, and a carboxyl group or an ion-exchanged carboxyl group, and optionally at least one polysaccharide having a hydroxyl group and a carboxyl group or an ion-exchanged carboxyl group; and
   (B) at least one material selected from the group consisting of (b1) hydroxycarboxylic acid, (b2) polyhydroxycarboxylic acid, (b3) a mixture of an aliphatic polyol and an aliphatic polybasic acid, and (b4) an aliphatic polyester obtained by the reaction of an aliphatic polyol with an aliphatic polybasic acid.

2. The copolymer resin composition according to claim 1, wherein the monosaccharide is mannuronic acid or guluronic acid.

3. A copolymer resin composition, comprising at least a copolymer obtained through dehydration-polycondensation of:
   (A) at least one material selected from the group consisting of a monosaccharide and a polysaccharide, the monosaccharide and polysaccharide having a hydroxyl group, and a carboxyl group or an ion-exchanged carboxyl group; and
   (B) at least one material selected from the group consisting of (b1) hydroxycarboxylic acid, (b2) polyhydroxycarboxylic acid, (b3) a mixture of an aliphatic polyol and an aliphatic polybasic acid, and (b4) an aliphatic polyester obtained by the reaction of an aliphatic polyol with an aliphatic polybasic acid, wherein the polysaccharide is present and comprises alginic acid.

4. The copolymer resin composition according to claim 2, wherein the hydroxycarboxylic acid is lactic acid; the polyhydroxycarboxylic acid is polylactic acid; the aliphatic polyol is ethylene glycol or 1,4-butanediol, and the aliphatic polybasic acid is succinic acid or adipic acid; the aliphatic polyester produced by reaction of an aliphatic polyol with an aliphatic polybasic acid is polyethylene succinate or polybutylene succinate.

5. A process for producing a copolymer resin composition, comprising the step of allowing a first reactant (A) and a second reactant (B) to undergo dehydration-polycondensation in the presence of a catalyst in an organic solvent containing substantially no water, the first reactant (A) being at least one monosaccharide having a hydroxyl group, and a carboxyl group or an ion-exchanged carboxyl group, and optionally at least one polysaccharide having a hydroxyl group and a carboxyl group or an ion-exchanged carboxyl group, the second reactant (B) being at least one material selected from the group consisting of (b1) hydroxycarboxylic acid, (b2) polyhydroxycarboxylic acid, (b3) a mixture of an aliphatic polyol and an aliphatic polybasic acid, and (b4) an aliphatic polyester obtained by the reaction of an aliphatic polyol with an aliphatic polybasic acid.

6. The process according to claim 5, further comprising the steps of:
removing from the reaction system at least part of the organic solvent; and
replenishing the reaction system with the organic solvent containing water in an amount less than, or equal to, the amount of water in the removed organic solvent, so that, during the dehydration-polycondensation, the amount of water in the organic solvent is controlled.

7. The process according to claim 6, further comprising the steps of:
subsequent to the removing step, processing the removed organic solvent so that it contains less water than the organic solvent in the reaction system; and
replenishing the reaction system with the processed organic solvent.

8. The process according to claim 7, wherein the removed organic solvent is processed by bringing the solvent into contact with a desiccating agent.

9. The process according to claim 8, wherein the desiccating agent is selected from the group consisting of an ion-exchange resin, a molecular sieve, diphosphorus pentoxide, and a metal hydride.

10. The process according to claim 5, wherein the polysaccharide is selected from the group consisting of alginic acid, an ion-exchanged form thereof, pectin and an ion-exchanged form thereof.

11. The process according to claim 10, wherein the ion-exchanged form of alginic acid is selected from the group consisting of an alkaline metal salt and an alkaline earth metal salt of alginic acid.

12. The process according to claim 10, wherein the ion-exchanged form of pectin is selected from the group consisting of an alkaline metal salt and an alkaline earth metal salt of pectin.

13. The process according to claim 5, wherein the hydroxycarboxylic acid is lactic acid; the polyhydroxycarboxylic acid is polylactic acid; the aliphatic polyol is ethylene glycol or 1,4-butanediol, and the aliphatic polybasic acid is succinic acid or adipic acid; and the aliphatic polyester produced by reaction of an aliphatic polyol with an aliphatic polybasic acid is polyethylene succinate or polybutylene succinate.

14. The copolymer resin composition according to claim 1, wherein the hydroxycarboxylic acid is lactic acid; the polyhydroxycarboxylic acid is polylactic acid; the aliphatic polyol is ethylene glycol or 1,4-butanediol, and the aliphatic polybasic acid is succinic acid or adipic acid; the aliphatic polyester produced by reaction of an aliphatic polyol with an aliphatic polybasic acid is polyethylene succinate or polybutylene succinate.

15. The copolymer resin composition according to claim 3, wherein the hydroxycarboxylic acid is lactic acid; the polyhydroxycarboxylic acid is polylactic acid; the aliphatic polyol is ethylene glycol or 1,4-butanediol, and the aliphatic polybasic acid is succinic acid or adipic acid; the aliphatic polyester produced by reaction of an aliphatic polyol with an aliphatic polybasic acid is polyethylene succinate or polybutylene succinate.

16. A copolymer resin composition, comprising at least a copolymer obtained through dehydration-polycondensation of:
(A) at least one of alginic acid and pectin; and
(B) lactic acid.

17. The copolymer resin composition according to claim 1, wherein material (B) comprises lactic acid.

18. The copolymer resin composition according to claim 2, wherein material (B) comprises lactic acid.

19. The copolymer resin composition according to claim 3, wherein material (B) comprises lactic acid.

* * * * *